(12) United States Patent
Eluard et al.

(10) Patent No.: US 10,484,671 B2
(45) Date of Patent: Nov. 19, 2019

(54) METHOD FOR DISPLAYING A CONTENT FROM 4D LIGHT FIELD DATA

(71) Applicant: THOMSON LICENSING, Issy les Moulineaux (FR)

(72) Inventors: Marc Eluard, Acigne (FR); Antoine Monsifrot, Rennes (FR); Olivier Heen, Domloup (FR)

(73) Assignee: InterDigital CE Patent Holdings, Paris (FR)

( * ) Notice: Subject to any disclaimer, the term of this patent is extended or adjusted under 35 U.S.C. 154(b) by 39 days.

(21) Appl. No.: 15/168,003

(22) Filed: May 28, 2016

(65) Prior Publication Data

US 2016/0353087 A1  Dec. 1, 2016

(30) Foreign Application Priority Data

May 29, 2015  (EP) .................................. 15305817

(51) Int. Cl.
| | |
|---|---|
| *H04N 13/302* | (2018.01) |
| *H04N 21/23* | (2011.01) |
| *H04N 21/25* | (2011.01) |
| *H04N 21/43* | (2011.01) |
| *H04N 21/4627* | (2011.01) |
| *H04N 21/81* | (2011.01) |
| *H04N 21/84* | (2011.01) |
| *G06T 5/00* | (2006.01) |
| *H04N 21/2343* | (2011.01) |
| *H04N 21/254* | (2011.01) |

(Continued)

(52) U.S. Cl.
CPC ........... *H04N 13/302* (2018.05); *G06T 5/002* (2013.01); *H04N 21/23439* (2013.01); *H04N 21/2541* (2013.01); *H04N 21/25435* (2013.01); *H04N 21/4318* (2013.01); *H04N 21/4627* (2013.01); *H04N 21/816* (2013.01); *H04N 21/8453* (2013.01)

(58) Field of Classification Search
None
See application file for complete search history.

(56) References Cited

U.S. PATENT DOCUMENTS

| | | | |
|---|---|---|---|
| 7,092,616 B2 | 8/2006 | Unger | |
| 7,620,178 B2 | 11/2009 | Wonfor et al. | |

(Continued)

FOREIGN PATENT DOCUMENTS

| | | |
|---|---|---|
| CN | 101297545 | 5/2012 |
| GB | 2488905 | 9/2012 |

(Continued)

OTHER PUBLICATIONS

Levin et al., "Understanding camera trade-offs through a Bayesian analysis of light field projections", 10th European Conference on Computer Vision, Marseille, France, Oct. 12, 2008, pp. 1-14.

(Continued)

*Primary Examiner* — Reza Aghevli
(74) *Attorney, Agent, or Firm* — Myers Wolin LLC

(57) ABSTRACT

A method for displaying a content from 4D light field data is described. Such method is executed by an electronic device, and is remarkable in that it comprises changing point of view of the content and/or a focus plane associated with the content, according to viewing rights.

20 Claims, 2 Drawing Sheets

(51) Int. Cl.
*H04N 21/2543* (2011.01)
*H04N 21/431* (2011.01)
*H04N 21/845* (2011.01)

(56) References Cited

U.S. PATENT DOCUMENTS

| | | |
|---|---|---|
| 8,280,049 B2 | 10/2012 | Quan |
| 8,416,289 B2 | 4/2013 | Akeley |
| 8,933,862 B2 * | 1/2015 | Lapstun .................. G02B 26/10 345/6 |
| 2003/0131251 A1 | 7/2003 | Fetkovich |
| 2007/0285554 A1 * | 12/2007 | Givon .................... G03H 1/268 348/340 |
| 2008/0297593 A1 * | 12/2008 | Debevec .............. G02B 27/225 348/51 |
| 2010/0332343 A1 * | 12/2010 | Onno ................. G06Q 30/0601 705/26.1 |
| 2011/0069233 A1 | 3/2011 | Quan |
| 2011/0128412 A1 * | 6/2011 | Milnes .................... G02B 27/22 348/231.99 |
| 2012/0311342 A1 * | 12/2012 | Nuzzi ..................... G06F 21/31 713/182 |
| 2013/0223673 A1 * | 8/2013 | Davis ........................ G06K 9/78 382/100 |
| 2014/0052555 A1 * | 2/2014 | MacIntosh ........... G06Q 20/208 705/23 |
| 2014/0098191 A1 * | 4/2014 | Rime ................... H04N 5/2254 348/46 |
| 2014/0146201 A1 * | 5/2014 | Knight ..................... H04N 9/04 348/231.99 |
| 2014/0300869 A1 * | 10/2014 | Hirsch ............... G02B 27/2214 353/7 |
| 2015/0195453 A1 | 7/2015 | Saito |
| 2015/0234477 A1 * | 8/2015 | Abovitz .............. G06F 16/7837 382/103 |
| 2015/0301592 A1 * | 10/2015 | Miller ..................... G06F 3/011 345/156 |
| 2015/0310601 A1 * | 10/2015 | Rodriguez ............ G06T 1/0007 348/150 |
| 2016/0026253 A1 * | 1/2016 | Bradski ................ G02B 27/225 345/8 |
| 2016/0029017 A1 * | 1/2016 | Liang ........................ G06T 7/80 348/175 |
| 2016/0042501 A1 * | 2/2016 | Huang ..................... G06T 5/003 345/428 |
| 2016/0248987 A1 * | 8/2016 | Zilly ................. G02B 27/0075 |
| 2016/0262608 A1 * | 9/2016 | Krueger ............... A61B 3/0041 |
| 2017/0209044 A1 * | 7/2017 | Ito .......................... A61B 3/024 |

FOREIGN PATENT DOCUMENTS

| | | | |
|---|---|---|---|
| WO | WO2006053804 | 5/2006 | |
| WO | WO-2006053804 A2 * | 5/2006 | .......... H04N 7/1675 |
| WO | WO2013074574 | 5/2013 | |
| WO | WO2013180192 | 12/2013 | |
| WO | WO2014149403 | 9/2014 | |

OTHER PUBLICATIONS

Anonymous, "LightField Features", LightField Forum, http://lightfield-forum.com/lightfield-features/, Dec. 2012, pp. 1-3.
Ng, R., "Digital Light Field Photography", PhD Dissertation in Computer Science, Stanford University, Jul. 2006, pp. 1-203.
Wanner et al., "Generating EPI Representations of 4D Light Fields with a Single Lens Focused Plenoptic Camera", International Symposium on Visual Computing, Las Vegas, Nevada, USA, Sep. 26, 2011, pp. 90-101.
Hirsch et al., "A Compressive Light Field Projection System", 41st International Conference on Computer Graphics and Interactive Techniques, Vancouver, British Columbia, Canada, Aug. 10, 2014, pp. 1-12.

* cited by examiner

METHOD FOR DISPLAYING A CONTENT FROM 4D LIGHT FIELD DATA

This application claims the benefit, under 35 U.S.C. § 119 of European Patent Application No. 15305817.7, filed May 29, 2015.

TECHNICAL FIELD

The disclosure relates to 4D light field data processing. More precisely, the disclosure relates to a technique for displaying a content (either a 2D image derived/extracted from a 4D light field data, or a set of images derived/extracted from a 4D light field data that can be interpreted as displayed 4D light field data).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The acquisition and rendering of 4D light-field data, which can be viewed as a sampling of a 4D light field (i.e. the recording of light rays as explained in FIG. 1 of the article: "*Understanding camera trade-offs through a Bayesian analysis of light field projections*" by Anat Levin et al., published in the conference proceedings of ECCV 2008) is an hectic research subject.

Indeed, compared to classical 2D images obtained from a camera, 4D light-field data enable a user to have access to more post processing features that enhance the rendering of images and/or the interactivity with the user. For example, with 4D light-field data, it is possible to perform with ease refocusing of images a posteriori (i.e. refocusing with freely selected distances of focalization meaning that the position of a focal plane can be specified/selected a posteriori), as well as changing slightly the point of view in the scene of an image. The acquisition of 4D light-field data can be done by different techniques (for example via the use of plenoptic camera, as depicted in document WO 2013/180192 or in document GB 2488905, or via the use a camera array as depicted in document WO 2014/149403).

In the state of the art, there are several ways to represent (or define) 4D light-field data. Indeed, in the Chapter 3.3 of the Phd dissertation thesis entitled "*Digital Light Field Photography*" by Ren N g, published in July 2006, three different ways to represent 4D light-field data are described. Firstly, 4D light-field data can be represented, when recorded by a plenoptic camera by a collection of micro-lens images. 4D light-field data in this representation are named raw images (or raw 4D light-field data). Secondly, 4D light-field data can be represented, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images (see for example the article entitled: "*Generating EPI Representation of a 4D Light Fields with a Single Lens Focused Plenoptic Camera*", by S. Wanner et al., published in the conference proceedings of ISVC 2011).

Usually, 4D light-field data can be used for displaying at least one 2D image in which refocusing a posteriori can be done (i.e. the display device is a conventional display device). But, it is also possible to display these 4D light-field data via a light field display device as the one depicted in document U.S. Pat. No. 8,933,862, or in the document U.S. Pat. No. 8,416,289. In a variant, the light field display device can be the one depicted in the article entitled "*A Compressive Light Field Projection System*" by M. Hirsch, G. Wetzstein, R. Raska, published in the conference proceedings of SIGGRAPH 2014.

In order to protect the delivering of 4D light-field data, one skilled in the art is urged to use classical Digital Right Management (DRM) techniques. For example, in the case that a Video On demand system provides 4D light-field data (intended to be either displayed at a light field content or a to be used for extracting 2D content to be displayed), one skilled in the art could have use the technique described in document WO 2006/053804. Hence, a degraded 4D light-field data that is obtained from a wavelet coefficient basis encoding technique, can still be viewed (but in a degraded way). Therefore, the user can decide to pay for having access to a non-degraded version of the received degraded 4D light-field data, in the same way as in document WO 2006/053804.

The present technique provides an alternative to this approach, that is less complex to implement.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for displaying a content from 4D light field data. The method is executed by an electronic device, and is remarkable in that it comprises changing point of view of said content and/or a focus plane associated with said content, according to viewing rights.

It should be noted that, in one embodiment, the concept of changing point of view correspond to changing perspective shift/parallax selection as explained in for example in the following link: http://lightfield-forum.com/lightfield-features/.

In a preferred embodiment, the method is remarkable in that said changing said point of view of said content and/or said focus plane associated with said content is done randomly in time.

In a preferred embodiment, the method is remarkable in that said changing said point of view of said content and/or said changing of said focus plane associated with said content is done based on a random spatial point of a scene associated with 4D light field data.

In a preferred embodiment, the method is remarkable in that said changing further comprises blurring at least part of said content.

In a preferred embodiment, the method is remarkable in that said blurring comprises adding Gaussian blur to said content.

In a preferred embodiment, the method is remarkable in that said blurring is done randomly in time.

In a preferred embodiment, the method is remarkable in that said blurring is a spatial blurring of said content that is done randomly.

In a preferred embodiment, the method is remarkable in that said content is a 4D light field data.

In a preferred embodiment, the method is remarkable in that said content is a 2D image or 2D video.

In a preferred embodiment, the method is remarkable in that said content is a 3D content or multiviews content.

In a preferred embodiment, the method is remarkable in that a difference value between consecutive changed points of views of said content and/or consecutive changed focus planes is defined as a function of said viewing rights.

In another embodiment of the invention, it is proposed a method for displaying a content from 4D light field data. Such method is executed by an electronic device, and is remarkable in that it comprises changing Light Field viewing parameters according to viewing rights. For example, the Light Field viewing parameters can be linked to the values of one or more features described in the following link: http://lightfield-forum.com/lightfield-features/, such as features related to the refocusing choices, and/or the choice of the all-in-focus option, and/or the change of the depth of field (as it can be variable), and/or the perspective shift/parallax selection, and/or the change of lighting, and/or the change of depth of Field. The changes of Light Field viewing parameters can be done randomly in time aspects.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment, it is proposed an electronic device for displaying a content from 4D light field data. The electronic device is remarkable in that it comprises a changing module configured to changing point of view of said content and/or a focus plane associated with said content, according to viewing rights.

In a variant, the electronic device is remarkable in that said changing said point of view of said content and/or said focus plane associated with said content is done randomly in time.

In one embodiment, the electronic device is remarkable in that said changing said point of view of said content and/or said changing of said focus plane associated with said content is done based on a random spatial point of a scene associated with 4D light field data.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

Figure 1:
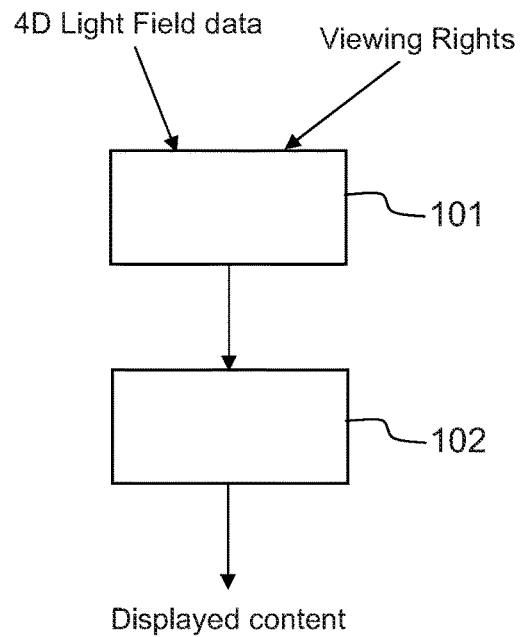
FIG. 1 presents a flowchart that comprises some steps of a method for displaying according to one embodiment of the disclosure.

FIG. 1 presents a flowchart that comprises some steps of a method for displaying according to one embodiment of the disclosure.

In a step referenced 101, an electronic device (as the one depicted in FIG. 3 of the present document) obtains 4D light-field data as well as viewing rights (or credentials). These viewing rights can be linked to a license that has been obtained after having paid for it.

For example, viewing rights can be associated with a degradation level (such as strong degradation, medium degradation, low degradation, or no degradation) to be applied to the received 4D light-field data.

In a step referenced 102, the electronic device verifies the value of the viewing rights. In the case that no degradations have to be done, the electronic device allows the display device (either a light field display device or a 2D display device) to process the 4D light-field data without restrictions. In the case the electronic device detects that the user should watch a degraded content from the received 4D light-field data, the electronic device controls the display device in such way that the display device has to display a degraded content. In one embodiment of the disclosure, in the case that the display device is 2D display device, the displayed content corresponds to one view extracted from the 4D light-field data. The point of view changes randomly from one view to another possible view, from time to time. For example, in the case that the viewing rights indicate a strong degradation of the displayed content, the displayed content (i.e. the 2D image) is displayed from a view point that changes every two seconds. Hence, the speed at which the point of view is changed is correlated to the value of the viewing rights. Therefore, the more credentials a user has, the more "stable" the point of view associated with the displayed content is.

In a variant, in the case that the display device is 2D display device, the displayed content (extracted from the 4D light-field data) is associated with a focus plane. The focus plane changes randomly from one possible value to another, from time to time. For example, in the case that the viewing rights indicate a strong degradation of the displayed content, the displayed content (i.e. the 2D image) is displayed with a focal plane that changes every two seconds. Hence, the speed at which the focal plane is changed is correlated to the value of the viewing rights. Therefore, the more credentials a user has, the more "stable" the focal plane associated with the displayed content is. Obviously, in one embodiment of the invention, the 2D display device can display degraded content in which both the value of the focal plane and the point of view are modified/changed during the display.

In another embodiment of the present principle, when the display device is a light field display device, a similar process for changing the point of views and/or the focal plane of a displayed content is done according to the value of viewing rights. Therefore, the present technique dynamically modifies the points of view during the display of 4D light-field data, when the viewing rights are not sufficient. When the user acquires sufficient viewing rights (e.g. pay-per-view) the process is stopped (or reduced). More precisely, in one embodiment, if a point of view is defined by a focus f (i.e. a pixel in the light field) and a pair of angles of view ($\theta$, $\psi$), then the present technique dynamically adds one additive perturbation ($\delta\theta$, $\delta\psi$) to the pair of angles ($\theta$, $\psi$) of a point of view during the display process. T, the new angle of the point of view is ($\theta+\delta\theta$, $\psi+\delta\psi$). The perturbation is a function of time, remarkable by a period and an intensity. The period is the duration before the next update of the point of view along time. The intensity is the maximal value of the perturbation.

Hence, in an embodiment, the perturbations are randomly chosen between zero and the intensity. The period may also be random.

In a variant, the intensity smoothly increases over the time. In a particular case, the intensity may be null at the beginning and for a pre-determined duration. After that, the intensity increases. This can be used for a teasing effect before degrading the user experience.

In a variant, the period smoothly decreases along time. This lets the degraded effect increase along time.

In a variant, the user's chosen point of view is not used at all, the point of view is only determined by the perturbation. In particular, the sequence of point of views can depend from points of interest in the images. In particular, the focus part of the point of view may be perturbed with a term $\delta f$. Note that the new focus f+$\delta f$ may lie outside the image (in particular for intense perturbation). In this case, it is preferable to choose a new focus f. The choice can be random or chosen among points that appear in each image. Therefore, this embodiment is advantageous in the case when the user does not choose any point of view. When the user later selects a point of view, two cases are possible according to the degradation policy:

The same perturbation parameters are applied with respect to the new user point of view.

Or the new user point of view is ignored.

It should be noted that, for a given intensity, the visual effect may vary according to the depth of the focus. For a same intensity, the visual impact is more important if the focus is on the background and the impact is less important if the focus is on the foreground.

The displayed content in output of step 102 conveys such modifications.

Figure 2:
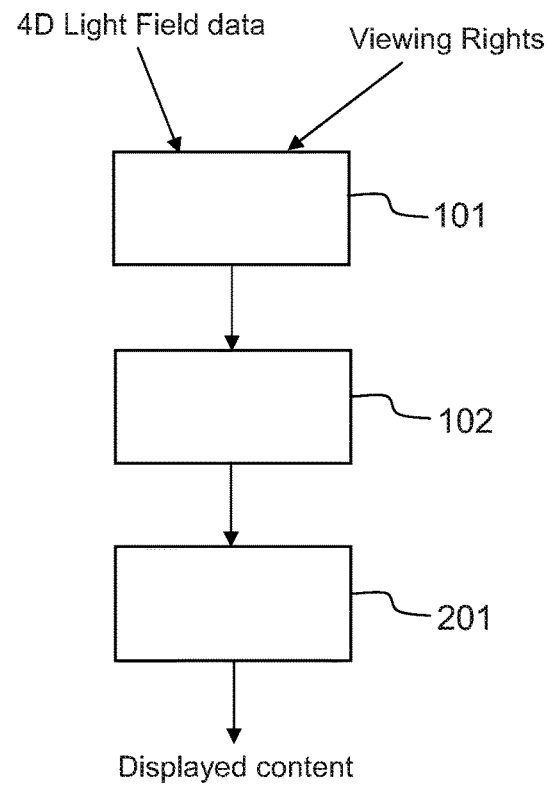
FIG. 2 presents a flowchart that comprises some steps of a method for displaying according to another embodiment of the disclosure.

FIG. 2 presents a flowchart that comprises some steps of a method for displaying according to another embodiment of the disclosure.

In addition to the previous mentioned steps (i.e. the steps 101 and 102), the method for displaying comprises a step referenced 201. The step 201 comprises the blurring of at least part of the content to be displayed.

Usually, the display of a light field content is done as follows: for each pixel p of the displayed image, we have $p = \Sigma\, m_i\, p_i$ where $p_i$ are the pixels corresponding to p in the sub-aperture images i and where $m_i$ is a ponderation value depending from the user chosen focus.

According to the present disclosure, a parameter $d_i$ is added for all pixel. Hence, we have: $p = \Sigma\, d_i\, m_i\, p$. When the user owns sufficient viewing rights, for all i, $d_i = 1$ and thus the display/restitution process is unmodified. When the user does not own sufficient viewing rights, $d_i$ varies in range [0;1]. This change introduces a blurring effect on the pixel.

The variation of $d_i$ is determined according to two parameters:
- a zone Z in the light field: within this zone the modification is active;
- a fog intensity F: applied within the zone.

An advantage of the present technique is that no additional information nor processing is required in order to create the effect: all the needed visual information is contained in the 4D light-field data. With more traditional content, such as a 2D picture, making the same effect requires additional information (e.g. parameters of a blurring effect) and dedicated processing.

In an embodiment of the disclosure, the zone Z covers the whole 4D light-field data. The value of $d_i$ is randomly chosen in the range of [1-F;1]. This results in a modification of each pixel of the displayed 4D light-field data. The value of F may increase smoothly along the time in order to intensify the degradation. The increase of F may stop at a pre-determine threshold in order to guarantee a minimal user experience. It should be noted that no pre- nor post-processing is required and that the additional operations benefit from knowing optimization of float multiplication. Typically in a set-top-box, there will be no significant additional delay.

In another embodiment, the zone Z does not cover entirely the 4D light-field data. For instance Z may be a circle with center C and radius r. C may be the center of the image and r may be fixed along time, typically one quarter of the image diagonal. Outside Z, $d_i=1$. Inside Z, the fog effect as defined previously can be applied. Additionally, the intensity F may vary according to the positions of the pixels in Z. For instance, F decreases with the distance to the center of Z. This leads to a stronger modification close to the center and a lesser modification close to the frontier of Z.

In another embodiment, the zone Z itself may vary along time. Typically, the center, the size and the shape may vary along time. In the case of a circle the radius may increase along time up to a predetermined threshold. The center may be chosen randomly. The center may follow a predetermined path within the image. The center may follow one relevant part of the light field (a face, main character, foreground, most rapidly moving object, etc.). The center may also depend from the user: mouse position, eyes focus, etc. The additional delay depends on: the determination of Z, the test to determine if a pixel belongs to Z.

Figure 3:
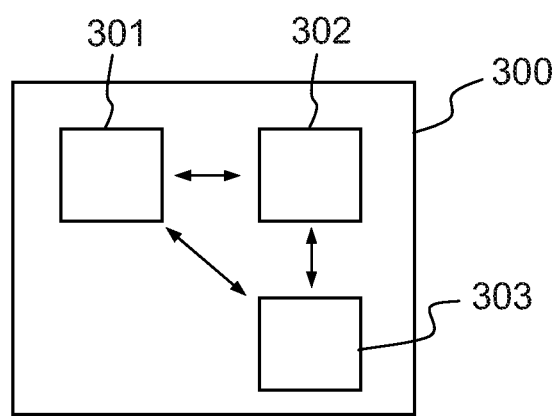
FIG. 3 presents an example of an electronic device that can be used to perform one or several steps of methods disclosed in the present document.

FIG. 3 presents an example of an electronic device that can be used to perform one or more steps of methods disclosed in the present document.

Such device referenced 300 comprises a computing unit (for example a CPU, for "Central Processing Unit"), referenced 301, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 302. Computer programs are made of instructions that can be executed by the computing unit. Such device 300 can also comprise a dedicated unit, referenced 303, constituting an input-output interface to allow the device 300 to communicate with other devices. In particular, this dedicated unit 303 can be connected with an antenna (in order to perform communication without contacts), or with serial ports (to carry communications "contact"). It should be noted that the arrows in FIG. 3 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 3.

In one embodiment of the disclosure, the electronic device depicted in FIG. 3 can be comprised in a light field display device or in a light field acquisition device that are configured to display and/or capture images (i.e. a sampling of a light field). These images are stored on one or more memory units. Hence, these images can be viewed as bit stream data (i.e. a sequence of bits). Obviously, a bit stream can also be converted on byte stream and vice versa.

In one embodiment of the disclosure, the electronic device depicted in FIG. 3 can be comprised in a set-top box, or in a mobile phone.

The invention claimed is:

1. A method for protecting a displaying of a content from a 4D light field data, the method being executed by an electronic device, the method comprises:
obtaining said 4D light-field data as well as viewing rights, sending said content for displaying and changing point of view of said content or a focus plane associated with said content, according to said viewing rights associated with a degradation level.

2. The method for protecting the displaying of the content according to claim 1, wherein said changing said point of view of said content or said focus plane associated with said content is done randomly in time.

3. The method for protecting the displaying of the content according to claim 1, wherein said changing said point of view of said content or said changing of said focus plane associated with said content is done based on a random spatial point of a scene associated with the 4D light field data.

4. The method for protecting the displaying of the content according to claim 1, wherein said changing further comprises blurring at least part of said content.

5. The method for protecting the displaying of the content according to claim 4, wherein said blurring comprises adding Gaussian blur to said content.

6. The method for protecting the displaying of the content according to claim 4, wherein said blurring is done randomly in time.

7. The method for protecting the displaying of the content according to claim 4, wherein said blurring is a spatial blurring of said content that is done randomly.

8. The method for protecting the displaying of the content according to claim 1, wherein said content is the 4D light field data.

9. The method for protecting the displaying of the content according to claim 1, wherein said content is a 2D image or 2D video.

10. The method for protecting the displaying of the content according to claim 1, wherein said content is a 3D content or multiviews content.

11. The method for protecting the displaying of the content according to claim 1, wherein a difference value between consecutive changed points of views of said content or consecutive changed focus planes is defined as a function of said viewing rights associated with the degradation level.

12. A non-transitory computer-readable storage medium storing a computer program comprising a set of computer-executable instructions that when said instructions are executed on a processor causes the processor to perform a method for protecting a displaying of a content from a 4D light field data, the method comprises obtaining said 4D light-field data as well as viewing rights, sending said content for displaying, and changing point of view of said content or a focus plane associated with said content, according to said viewing rights associated with a degradation level.

13. A display device for protecting a displaying of a content from a 4D light field data, the display device comprising a processor configured to obtain said 4D light-field data as well as viewing rights, sending said content for displaying and change point of view of said content or a focus plane associated with said content, according to viewing rights associated with a degradation level.

14. The display device for protecting the displaying of the content according to claim 13, wherein said changing said point of view of said content or said focus plane associated with said content is done randomly in time.

15. The display device for protecting the displaying of the content according to claim 13, wherein said changing said point of view of said content or said changing of said focus plane associated with said content is done based on a random spatial point of a scene associated with the 4D light field data.

16. A device for protecting a displaying of a content from a 4D light field data, the device comprising:
a processor for obtaining said 4D light-field data as well as viewing rights, sending said content for displaying and changing point of view of said content or a focus plane associated with said content, according to said viewing rights associated with a degradation level.

17. The device of claim 16, wherein said changing said point of view of said content or said focus plane associated with said content is done randomly in time.

18. The device of claim 17, wherein said changing said point of view of said content or said changing of said focus plane associated with said content is done based on a random spatial point of a scene associated with the 4D light field data.

19. The device of claim 16, wherein said changing further comprises blurring at least part of said content.

20. The device of claim 16, wherein a difference value between consecutive changed points of views of said content or consecutive changed focus planes is defined as a function of said viewing rights associated with the degradation level.

* * * * *